Patented Dec. 26, 1933

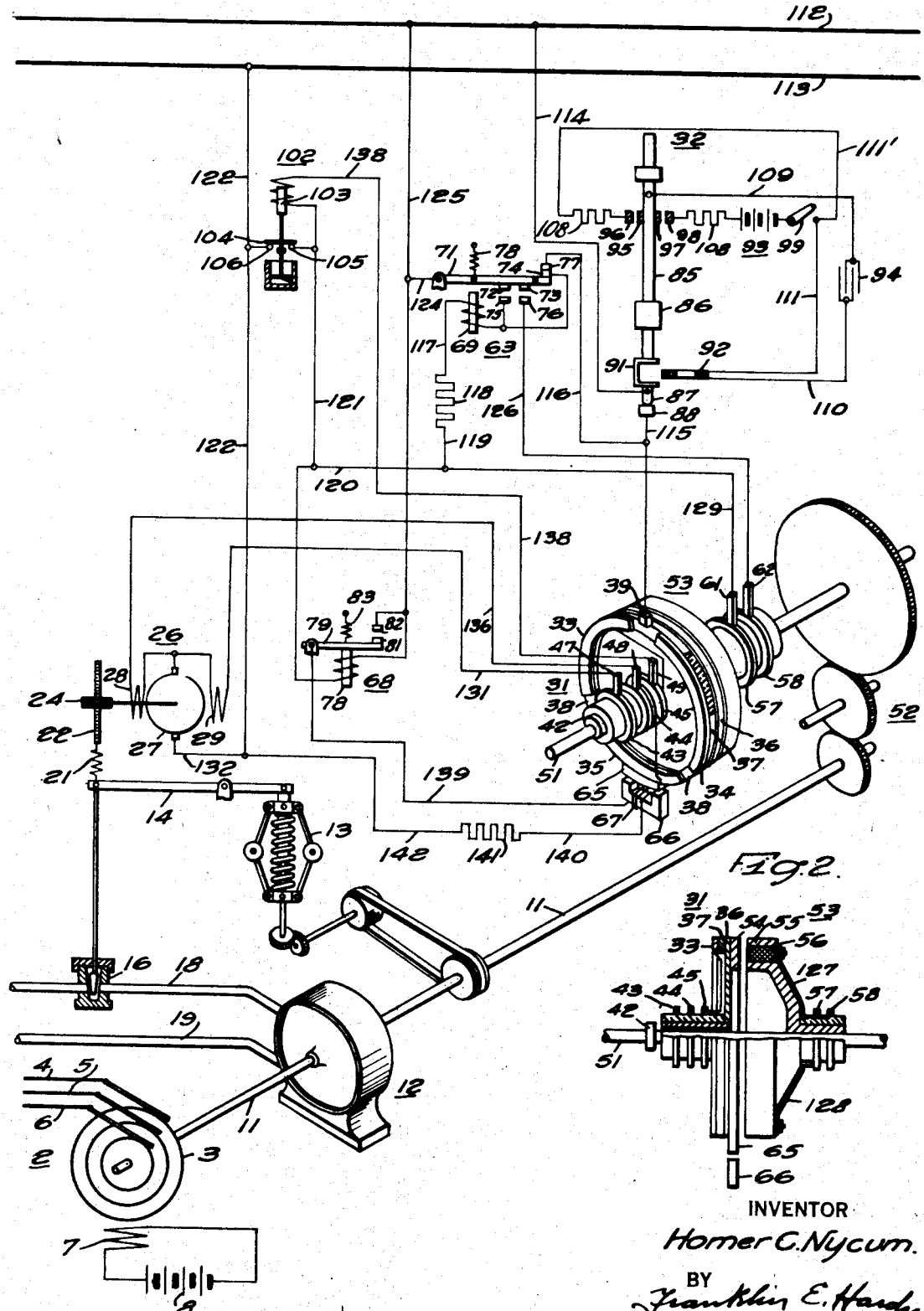

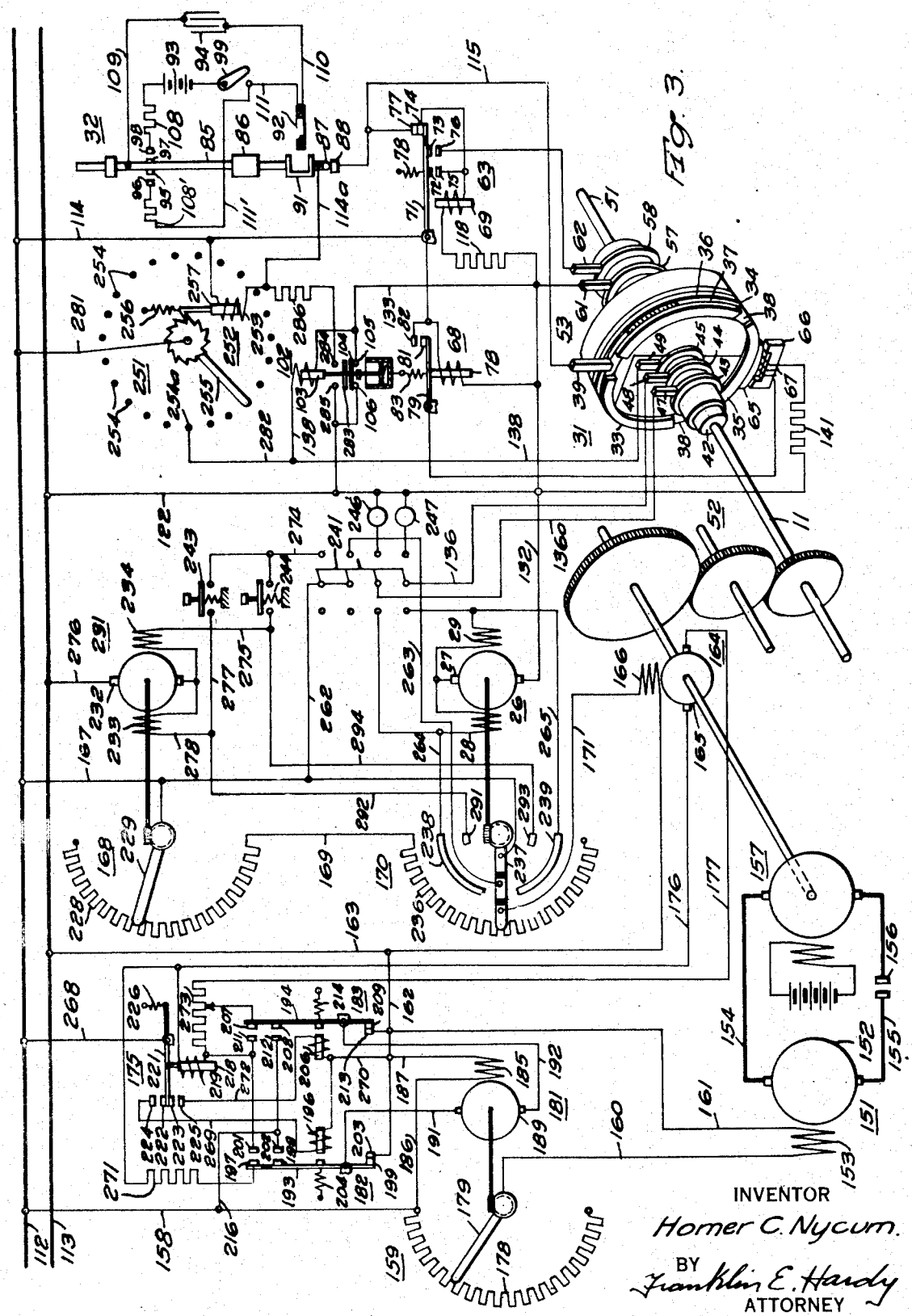

1,940,876

UNITED STATES PATENT OFFICE 1,940,876

REGULATING SYSTEM

Homer C. Nycum, Wilkinsburg, Pa., assignor to Westinghouse Electric & Manufacturing Company, a corporation of Pennsylvania Application August 13, 1931. Serial No. 556,777

5 Claims. (Cl. 172—293)

My invention relates to regulating systems, and has particular relation to systems for regulating the speed of rotating machines and apparatus.

In many applications it is imperative that the speed of rotating apparatus be accurately maintained at some predetermined value in order that the equipment involved may be permitted to function satisfactorily, in the manner intended. One such application is the regulation of the speed and frequency of generators in alternating-current power stations. Another example involves the problem of properly controlling the speed of motors utilized to drive paper mills or other industrial machines and devices where exceedingly accurate regulation is required.

In the case of a generating station which is connected to a power system comprising several interconnected stations, changes in the frequency of one station set up high synchronizing currents, and in extreme cases may cause the station generators to fall out of step with the system. In addition, synchronous-type electrically-driven time pieces, which are now extensively used, makes it highly desirable that the frequency of the power-station voltage, which supplies electrical energy for domestic and general purposes be maintained within such closely predetermined limits as to permit these time pieces to provide accurate and reliable time indications.

It is, accordingly, an object of my invention to provide a speed-regulating system which is capable of maintaining the speed of a regulated machine within exceedingly close limits.

Another object of my invention is to provide a system, for governing the speed of a dynamo-electric machine, which shall be accurate, reliable in operation, and capable of extremely close speed-maintaining adjustment.

A more specific object of my invention is to provide a frequency-regulating system that shall be capable of maintaining the generators in a power station or electrical system at a frequency which is within such closely predetermined limits that synchronous-type electrically-driven time pieces may be accurately operated by the voltage of said generators.

Another object of my invention is to provide a regulator system, that will continually correct itself for errors in the regulated quantity.

In practicing my invention, I contemplate the utilization of a pendulum or equivalent type of speed reference means together with apparatus for causing the speed of the regulated machine to be controlled in a manner that it will bear a predetermined fixed relation to the frequency of oscillation of the pendulum.

My invention will be better understood from the following description of specific embodiments thereof, when read in conjunction with the accompanying drawings, in which:

Figure 1 is a diagrammatic view of apparatus and circuits employed in a preferred embodiment of my invention utilized to control the frequency of an alternating-current generator;

Fig. 2 is a detail view, partially in side elevation and partially in section, of a magnetic clutch and a segment wheel utilized in the system of my invention; and, Fig. 3 is a diagrammatic view of apparatus and circuits employed in a preferred embodiment of my invention utilized to regulate the speed of a motor.

Referring to Fig. 1 of the drawings, a generator 2, whose frequency is to be regulated, comprises an armature winding 3, connected to circuit-conductors 4, 5 and 6, and a field winding 7, energized from any suitable direct-current source, such as a battery 8. The rotor of generator 2 is mechanically connected, by means of a shaft 11, to prime-mover driving means, such as a turbine 12. The speed of the turbine is regulated by a governor mechanism 13, which controls the position of a pivoted lever 14 to operate a valve 16 in the pen-stock or motive-fluid supply conduit 18, in accordance with speed, and thereby regulate the quantity of motive fluid supplied to turbine 12. The motive fluid is conducted away from the prime mover by means of a second conduit 19.

In order to vary the setting of the governor mechanism, to thereby adjust the prime mover speed which this mechanism will maintain, a spring 21 may be employed. One end of the spring 21 is attached to the lever 14, near its left-hand end in Fig. 1, and the other end is affixed to a threaded member 22 that is free to move vertically in an interiorly threaded gear wheel 24. When the gear wheel 24 is rotated the member 22 moves upwardly or downwardly, thereby varying the tension of the spring which determines the setting of the governor, that is, the amount of motive fluid which the governor will permit to pass to the prime mover 12 at a given prime-mover speed.

A motor 26 is provided for actuating the gear wheel 24, and comprises an armature winding 27 and differentially related series field windings 28 and 29. The operation of the motor is controlled by means of a segment wheel 31 cooperating with a frequency or speed reference means 32.

The segment wheel 31 is provided with three, or a multiple thereof, arcuate electrical conducting segments 33, 34 and 35 that are disposed about the periphery of a circular base 36 from which they are separated by suitable insulating material 37. The segments are separated from each other by gaps 38. A brush 39, suitably mounted, is adapted to successively engage the segments 33, 34 and 35 as the segment wheel 31 rotates. A collar member 42 is attached to or made integral with the base 36 and carries thereon three slip rings 43, 44 and 45 that are electrically connected, respectively, to the segments 33, 34 and 35 and that cooperate, respectively, with brushes 47, 48 and 49.

The segment wheel 31 is loosely mounted on a shaft 51 that is connected to be rotated in accordance with the speed of the shaft 11 by means of a gear train 52. A magnetic clutch 53 is provided to lock the segment wheel to the shaft 51 to be rotated thereby when desired. The magnetic clutch may be of any suitable character, and I have illustrated it as comprising an annular armature or pole piece 54 loosely mounted on the shaft 51 and affixed to the base 36, and a field element 55 that is keyed to the shaft 51 and provided with a magnetizing winding 56 that is energized through slip rings 57 and 58 mounted on the shaft 51 and cooperating with brushes 61 and 62, respectively. The energization of the winding 56 is controlled by a relay 63.

The segment 33, carried by wheel 31, functions as a conducting element in the motor-control circuit to operate the motor 26 in a direction to raise the speed of the prime mover, and may be termed the "raise" segment. Similarly, the segment 34 is the "lower" segment.

Under certain operating conditions it may be desirable to disengage the segment wheel 31 from the magnetic clutch 53 and allow it to come to rest, or to be reset. When the segment 35 comes in contact with the brush 39 under certain operating conditions, it initiates the disengagement of the segment wheel and may be termed the "reset" segment.

To reset the segment wheel 31 after it is disengaged from the magnetic clutch, a counterweight 65 is attached to the pole piece, which, after a series of oscillations, brings the segment wheel to rest with the brush 39 midway between the "raise" and "lower" segments. A braking magnet 66 is provided to supplement the action of the counterweight, to bring the wheel to rest more quickly. An operating winding 67 is provided for the magnet, the energization of which is controlled by a relay 68.

The relay 63 comprises a magnetic core 69, a pivoted lever arm 71 which carries movable contact members 72, 73 and 74 that cooperate, respectively, with stationary contact members 75, 76 and 77, and a biasing member 78 for normally holding the cooperating contact members 74 and 77 in engagement. Energization of the winding associated with core 69 causes a downward pull to be exerted on arm 71 which overcomes the restraining force of the biasing member 78.

The relay 68 comprises a magnetic core 78, a pivoted lever arm 79 carrying a movable contact member 81 that cooperates with a stationary contact member 82 and a biasing member 83 that normally opposes the downward pull of the core member 78.

The frequency or speed reference means 32 comprises a pivoted pendulum 85, the period of which may be adjusted by means of a bob or movable weight 86, a movable contact member 87 affixed to the end of the pendulum and adapted to engage a stationary contact member 88, and means for driving the pendulum. The pendulum driving means comprises a permanent magnet 91 that is integral with the pendulum 85, a coil of conducting wire 92 and a battery 93 for energizing the coil 92. A condenser 94 is provided in the energizing circuit for the coil 92, which circuit is completed through cooperating contact members 95 and 96 when the pendulum moves in one direction and through cooperating contact members 97 and 98 when the pendulum moves in the other direction, the contact members 95 and 97 being disposed on the pendulum. A switch 99 is provided to interrupt the energizing circuit for the coil 92.

A reset relay 102, having time delay characteristics, is provided for controlling the energization of the operating windings of the relays 63 and 68, and comprises a magnetic core 103 that actuates a movable contact member 104 which is adapted to bridge stationary contact members 105 and 106. The time delay means illustrated is of the well known oil-filled dashpot type, attached to the movable element of the relay.

The operation of the embodiment of my invention illustrated in Fig. 1 is as follows:

As illustrated, the regulating equipment is so disposed that, at normal speed of the shaft 51, two rotations of the shaft occur in a time equal to the period of the pendulum 85. Thus, as a preliminary adjustment, the bob 86 is so positioned on the pendulum 85 that the time required for the pendulum to swing from one extreme position, to the other will be equal to the time required for shaft 51 to exactly complete one revolution when the speed of generator shaft 11 is at the desired value. It will be understood that the term period used above designates the time taken for a complete pendulum oscillation, which involves two passages through the neutral or mid-position illustrated.

To put the pendulum into operation, so that the electrical driving apparatus described may function to maintain the back and forth swinging action, a switch 99 is closed and the pendulum moved by hand, toward the right, for example. When the contact members 97 and 98 come into engagement, a circuit is completed for energizing the coil 92 which may be traced from one side of the battery 93 through a current-limiting resistor 108, the contact members 97 and 98, the pendulum 85, conductor 109, the condenser 94, conductor 110, the coil 92, conductor 111, and switch 99 to the other side of the battery.

The direction of the current through the coil 92 is such that the magnetic field set up thereby repels the magnet 91 and the pendulum is impelled towards the left. When the contact members 95 and 96 come into engagement, a circuit is completed to discharge the condenser 94 and energize the coil 92 in a direction which sets up a magnetic field in a direction oppositely to that previously described. This circuit extends from one side of the condenser 94 through conductor 110, coil 92, conductors 111 and 111', current-limiting resistor 108', the contact members 96 and 95, the pendulum 85, and conductor 109, back to the other side of condenser 94. This attracts the magnet 91, and impels the pendulum towards the right. This cycle of operation will be repeated as long as the switch 99 remains closed.

As the pendulum 85 thus swings back and forth, through the mid-position, the contact member 87 engages the contact member 88 to momentarily complete a circuit which connects the operating winding of the relay 63 to supply conductors 112 and 113, to actuate the lever arm 71 downwardly. The operating circuit for the relay 63 may be traced from the one supply conductor 112, through conductor 114, the pendulum 85, the contact members 87 and 88, conductors 115 and 116, the contact members 77 and 74 of the relay 63, the operating winding of the relay 63, conductor 117, a resistor 118, conductors 119, 120 and 121, the normally bridged contact members 105 and 106 of the relay 102 and conductor 122 to the other supply conductor 113.

The actuation of the lever arm 71 of the relay 63 causes the disengagement of the cooperating pair of contact members 74 and 77, and effects the engagement of the cooperating pairs of contact members 72—75 and 73—76. The disengagement of the contact members 74 and 77 interrupts the above traced circuit which connected the operating winding of the relay 63 to the supply conductor 112, while the engagement of the contact members 72 and 75 connects the operating winding of the relay 63 to the supply conductor 112 through the contact members 75 and 72, the lever arm 71, conductor 124, and conductor 125.

The engagement of the contact members 73 and 76 completes a circuit for energizing the winding 56 of the magnetic clutch 53 which causes the field member 55 of the clutch to attract the pole piece 54 and the segment wheel 31, thereby causing it to rotate in accordance with the speed of the shaft 11. The circuit for energizing the winding 56 of the magnetic clutch 53 extends from the supply conductor 112 through conductors 125 and 124, the lever arm 71 and the cooperating contact memers 73 and 76 of the relay 63, conductor 126, the brush 62, the slip-ring 58, conductor 127, the winding 56, conductor 128, the slip-ring 57, the brush 61, conductors 129, 120 and 121, the normally bridged contact members 105 and 106 of the relay 102, and conductor 122 to the supply conductor 113.

If the segment wheel is engaged by the magnetic clutch 53 and continues rotation from the position shown in Fig. 1 at the moment the contact member 87 of the pendulum makes contact with the stationary contact member 88, with the proper ratio of the gears 52, the segment wheel 31 will have made one revolution by the time the contact members 87 and 88 come into engagement upon the return swing of the pendulum 85. Thus, when the contact members 87 and 88 come into engagement there is no circuit completed through the segment wheel 31, as the brush 39 is between the segments 33 and 34.

When the relay 102 is deenergized and is in the position illustrated in the drawing, it completes a circuit through the operating winding of the relay 68 to energize this relay and hold the contact members 81 and 82 thereof apart against the force of the biasing member 83. This maintains, in an interrupted condition, the circuit for energizing the operating winding 67 of the braking magnet 66. The circuit for the operating winding of the relay 68 extends from the supply conductor 112, through conductor 125, the operating winding of the relay 68, conductor 121, the bridged contact elements 105 and 106 of the relay 102, and conductor 122 to the supply conductor 113.

Should the frequency of the generator 2 fall below the desired value, due to a decrease in the speed of the driving shaft 11, the segment wheel 31 will lag behind the pendulum 32, and, after a certain number of revolutions, the segment wheel 31 will be so retarded that the "raise" segment 33 thereof will be in contact with the brush 39 when the pendulum contact member 87 is making contact with the stationary contact member 88. For such a condition, there is completed a circuit through the armature winding 27 and one of the differentially-related series-field windings 29 of the speed-adjusting motor 26 which operates the motor in a direction to increase the tension upon the spring 21 and thus raise the speed of turbine 12.

The circuit for operating motor 26 extends from the supply conductor 112, through conductor 114, the pendulum 85, the contact members 87 and 88, conductor 115, the brush 39 and the segment 33 of segment wheel 31, the slip-ring 43, the brush 47, conductor 131, the field winding 29, the armature winding 27 and conductors 132 and 122 to supply conductor 113.

The increased tension on the spring 21 causes the lever arm 14 to increase the opening of the valve 16, thereby allowing more motive fluid to be supplied to the prime mover 12, to thus increase the speed of the driving shaft 11 and raise the frequency of the generator to the desired value.

It will be seen that the operating circuit for the motor 26 is completed only during the interval of time that the contact members 87 and 88 are in engagement. If the prime mover speed has not been sufficiently corrected, during one period of such engagement, to so speed up segment wheel 31 that the brush 39 is out of engagement with the segment 33 when the contact members 87 and 88 again come into engagement, the circuit to operate the motor will again be completed. This action will continue until the speed of the prime mover is properly corrected. Such increase in the speed of the prime mover is transmitted to the segment wheel 31, and when the speed of the prime mover is again at the desired value, the brush 39 will be midway between the contact segments 33 and 34 when the pendulum contact member 87 is in engagement with the contact member 88.

Should the speed of the prime mover increase above that required to maintain the frequency of the generator at the desired value, the segment wheel will increase its speed with respect to the timing pendulum 85. After a certain number of revolutions of the segment wheel the "lower" segment 34 will be in contact with the brush 39 when the pendulum contact member 87 is making contact with the stationary contact member 88, thus completing a circuit through the armature winding 27 and the differential field winding 28 of the motor 26, to operate the motor in a direction, opposite to that previously described, to decrease the tension upon the spring 21. The circuit for operating the motor may be traced from the supply conductor 112, conductor 114, the pendulum 85, the contact members 87 and 88, conductor 115, the brush 39 and the segment 34, the slip-ring 44, the brush 48, conductor 136, the differentially-related field winding 28, the armature winding 27, and conductors 132 and 122, to the supply conductor 113.

The decrease in tension of the spring 21 causes the lever arm 14 to decrease the opening of the valve 16, thereby curtailing the motive fluid supplied to the prime mover 12, to thus decrease the frequency of the generator to the desired value, by decreasing the speed of the driving shaft 11. The motor 26 will be operated at each successive engagement of the pendulum contact member 87, if at that instant the brush 39 is in engagement with the segment 34. This action will continue until the required correction has been made. When the speed of the prime mover has been decreased sufficiently and the frequency of the generator is at the desired value, the speed of the segment wheel will have decreased and will be again rotating at such speed that the brush is midway between the segments 33 and 34 when the pendulum contact member 87 is making contact with the contact member 88.

When the speed of the prime mover changes considerably, due to abnormal operating conditions, the change in speed between each corrective operation of the motor may be greater than the corrective change effected by the operation of the motor. Under such conditions the segment wheel may be so retarded or so advanced that the segment which controls the operation of the governor-adjusting motor in a direction to increase the error in speed may be under the brush 39 when the pendulum contact member 87 is engaging the contact member 88. In other words, assuming, for example, an excessive drop in speed, between successive engagements of the pendulum contacts 87 and 88, or because of an accumulation during a number of swings of the pendulum, the speed change of the regulated machine might be so great that the segment wheel 31 would be retarded completely past the "raise" segment 33. Engagement with brush 39 and "lower" segment 34 would instead engage the brush when the pendulum contacts 87 and 88 are contacting. Thus, "lower" impulses would be imparted when in reality "raise" impulses are absolutely required.

In such case it is desirable to disengage the segment wheel from the magnetic clutch and bring it to rest or reset it, discarding the lost revolutions of the prime mover. The "reset" segment 35 is employed for this purpose.

When the rotational position of the segment wheel becomes such that the reset segment 35 is in engagement with the brush 39 when the pendulum contact member 87 engages the contact member 88, a circuit is established for energizing the operating winding of the relay 102 to actuate the movable contact member 104 upwardly.

The circuit for energizing the operating winding of the relay 102 extends from the supply conductor 112, through conductor 114, the pendulum 85, the contact members 87 and 88, conductor 115, the brush 39, the segment 35, the slip-ring 49, the brush 49, conductor 138, the operating winding and the bridged contact members 105 and 106 of the relay 102, and conductor 122, to the supply conductor 113.

It will be seen that the actuation upwardly of the contact member 104 interrupts the circuits for energizing the relays 63 and 68. When the energizing circuit for the relay 63 is interrupted, the biasing member 78 pulls the lever arm 71 upwardly, thereby disengaging the cooperating pairs of contact members 72—75 and 73—76, which interrupts the energizing circuit for the winding 56 of the magnetic clutch 53 and thus removes the driving force from the segment wheel 31, to allow it to come to rest or to be reset.

When the operating circuit for the relay 68 is interrupted the biasing member 83 pulls the lever arm 79 upwardly to effect engagement of the contact members 81 and 82, thereby completing an energizing circuit for the operating winding 67 of the braking magnet 66. This circuit extends from the supply conductor 112, through conductor 125, the contact members 82 and 81 and the lever arm 79 of the relay 68, conductor 139, the braking-magnet winding 67, conductor 140, a resistor 141, and conductors 142 and 122 to the supply conductor 113. The energization of the magnet 66 quickly brings the segment wheel 31 to rest.

The relay 102 is adjusted to have such a delay from the time it is actuated until it again closes its contacts, that the segment wheel 31 has time to come to rest and reset during that period. Upon re-engagement of the contacts of relay 102, the contact members 74 and 77 of the relay 63 still being closed, the circuit for operating the relay 63 is completed up to the pendulum contact member 87. Thus when the pendulum contact members 87 and 88 again come into engagement the relay 63 is actuated so that the circuit for energizing the clutch magnet is completed substantially at the moment the pendulum contact members come into engagement as hereinbefore described.

It will be noted that the position in which segment wheel 31 came to rest, during the resetting operation, is the one in which, as illustrated, the gap between raise and lower segments 33 and 34 lines up with brush 39, this particular position having been determined by the action of counterweight 65 and braking magnet 66 in the manner before explained.

Consequently, the energization of the clutch magnet winding 56, which will be seen to be accomplished by a deenergization of the braking magnet by action of relay 68, initiated by the reclosure of the contacts of relay 102, causes segment wheel 31 to again be locked to shaft 51 in such a position that pendulum contact members 87 and 88 are in engagement at the instant when the space between segments 33 and 34 is in line with brush 39, which, as has been seen, is the desired relation.

In addition to the frequency regulation application just described, my invention may likewise be applied to many other situations, in which is included the regulation of the speed of an electric motor, previously mentioned. Such an embodiment is illustrated in Fig. 3 of the drawings, in which the motor whose speed is to be regulated is shown generally at 157. To supply power to the motor, a generator 151, comprising an armature winding 152 and a field winding 153, is provided. The generator armature winding 152 is connected by conductors 154 and 155 and circuit interrupting means 156, to the armature of motor 157 to which it supplies energy.

The field winding 153 of the generator is energized from the supply conductors 112 and 113 through a circuit which extends from the supply conductor 112 through conductor 158, a motor-operated rheostat 159, a conductor 160, the field winding 153, conductors 161, 162 and 163 to the supply conductor 113. The motor 157, whose speed is to be regulated, drives a pilot generator 164 that generates a voltage proportional to the speed of the motor.

The pilot generator 164 comprises an armature winding 165, and a field winding 166. Winding 166 is connected to be energized from the supply conductors 112 and 113 through a circuit that extends from the supply conductor 112 through conductor 167, a motor-operated rheostat 168, conductor 169, a motor-operated rheostat 170, conductor 171, the field winding 166, and conductor 163 to the supply conductor 113.

In order to control the speed of the motor 157, a regulator 175 is provided for varying the excitation of the generator 151 in accordance with the voltage generated by the pilot generator 164. The pilot-generator armature winding 165 is connected to the operating winding of the regulator by means of conductors 176 and 177.

With constant settings of the rheostats 168 and 170, appreciable errors or drifting in the regulated speed occur because of the magnetic lag or hysteresis of the field magnetic circuit of the pilot generator, and for this reason it is difficult, and frequently impossible, to maintain extremely close speed regulation. To overcome this difficulty I propose to so regulate the excitation of the pilot generator 164 that for very minute variations in the speed of the motor 157, from the desired value determined by timing device 32, the excitation of the pilot generator will be changed to adjust the voltage generated for the further correction of the excitation of the general 151 and the speed of the motor 157.

The rheostat 159 comprises a resistor element 178, and a movable contact arm 179 which is operated by a motor 181, controlled by reversing switches 182 and 183 in accordance with the operation of the regulator 175.

The motor 181 comprises a field winding 185 that is energized from the supply conductors 112 and 113 through a circuit which extends from the supply conductor 112 through conductors 158 and 186, the field winding 185 and conductors 187, 162 and 163 to the supply conductor 113, and with an armature winding 189 that is connected, by means of conductors 191 and 192, to the contact arms 193 and 194, respectively, of the reversing switches 182 and 183.

The reversing switch 182 comprises the movable contact arm 193 and an electromagnet 196, the arm 193 carrying movable contact members 197, 198 and 199, that cooperate, respectively, with stationary contact members 201, 202 and 203. A biasing member 204 is provided for normally holding the contact members 199 and 203 in engagement. The reversing switch 183 is similar in construction to the reversing switch 182 and comprises an electromagnet 206, the movable contact arm 194, movable contact members 207, 208 and 209, that cooperate with stationary contact members 211, 212 and 213, and a biasing member 214.

The stationary contact members 203 and 213 of the reversing switches 182 and 183, respectively, are connected by means of the conductors 162 and 163 to the supply conductor 113. The stationary contact members 202 and 212 of the reversing switches 182 and 183, respectively, are connected by means of conductors 216 and 158 to the other supply conductor 112, and are adapted to connect one side of the motor armature 189 to the supply conductor 112 upon the operation of one of the reversing stitches, and to connect the other side of the armature to the supply conductor 112 upon the operation of the other reversing switch.

When the electromagnets of the reversing switches 182 and 183 are unenergized the switches stand in the positions illustrated in the drawing to close a circuit from one side of the motor armature 189, through conductor 191, the contact arm 193 and the cooperating contact members 199 and 203 of the reversing switch 182, conductor 162, the cooperating contact members 213 and 209 and the contact arm 194 of the reversing switch 183, and conductor 192 to the other side of the motor armature winding 189, thus establishing a dynamic braking circuit for motor 181. Upon the operation of the one or the other of the reversing switches 182 and 183 to a second operative position the motor 181 is connected to the supply conductors 112 and 113 to be operated in the one direction or the other.

The control element of regulator 175 comprises an armature core member 218 and an operating winding 219 that is energized in accordance with the voltage of the pilot generator 164. The core member 218 is connected to a pivoted lever 221 that carries movable contact members 222 and 223 which cooperate, respectively, with stationary contact members 224 and 225. The regulator is also provided with a biasing member 226 that normally opposes an upward pull of the core member 218.

Upon the engagement of the contact members 222 and 224, a circuit is completed through the operating winding of the electromagnet 196 to actuate the reversing switch 182 to a second operative position. Upon the engagement of the contact members 223 and 225, a circuit is completed through the operating winding of the electromagnet 206 to actuate the reversing switch 183 to a second operative position.

The rheostat 168 comprises a resistor element 228 and a movable contact arm 229 that is operated by a motor 231 comprising an armature winding 232 and differentially-related series field windings 233 and 234.

The rheostat 170 comprises a resistor element 236, a movable contact arm 237 and arcuate electrical conducting segments 238 and 239. The rheostat is operated by the motor 26 which is controlled by the segment wheel 31 and the pendulum 32 in a manner similar to that described for Fig. 1. The elements of the two rheostats 168 and 170, respectively, are so proportioned that the resistance between two buttons of the resistor 228 is equivalent to the resistance of each half of resistor 236.

In starting the system it is desirable to take the control of the speed of the motor 157 away from the pendulum and to adjust it to the desired value by operating the motor 231 to change the setting of the rheostat 168. After the speed of the motor 157 has been adjusted as closely as possible by this means, the control of the motor speed may then be transferred to the pendulum.

To permit the transfer of the speed control, switching means 241 are provided, which, when closed in one direction places the motor speed under the control of the pendulum, and when closed in the other direction permits the operation of motor 231 in the one direction or the other by means of control switches 243 and 244. Indicating lamps 246 and 247, adapted to be connected to the segments 33 and 34, respectively, of segment wheel 31, are provided to indicate, when the switch 241 is in the position for manual control, whether the motor is running slow or fast.

In case the load on the motor 157 is of such character that the changes in speed are relatively erratic, the regulating action produced by the pendulum and the segment wheel may cause hunting. Also in certain motor applications, it is more desirable to restore the speed of the motor to normal than to temporarily increase or decrease the speed to compensate for the change in speed, or recover the lost revolutions.

To overcome the hunting action and to maintain the speed of the motor 157 normal, a counting device 251 is provided, which after a certain number of corrective impulses given to the motor 26, energizes the reset relay 102 to reset the segment wheel 31.

The counting device 251 comprises a notching relay 252 having an operating winding 253, a plurality of contact points 254, a contact arm 255 adapted to be actuated by the relay 252 and a biasing member 256 adapted to draw the relay core 257 upwardly after each impulse in order that the relay may actuate the contact arm 255 when the relay is again energized. The operating winding 253 of the relay is connected in the control circuits for the motor 26.

The operation of the embodiment of my invention illustrated in Fig. 3 is as follows:

As has been pointed out, regulator 175 acts to control the speed of motor 157 by so regulating the motor energizing voltage as to maintain the potential of pilot generator 164, driven by motor 157, at a predetermined or constant value.

In starting the system, the switch 241 is first closed to the right to the manual control position. The speed of the motor 157 may then be adjusted by the manual control switches 243 and 244 in a manner to be described.

In case the contact arm 237 of the rheostat 170 should be in any other position than the mid-position when the switch 241 is thus closed for manual control, an energizing circuit is completed through one of segments 238 or 239, to operate the motor 26 in such a direction as will move the contact arm 237 to the mid-position on the resistor 236.

One of the operating circuits for the motor 26 extends from the supply conductor 112, through conductors 167 and 262, the switch 241, conductor 263, the contact arm 237 and the segment 238 of the rheostat 170, conductor 264, the field winding 28 and the armature winding 27 of motor 26, and conductors 132 and 122 to the supply conductor 113.

The other circuit for operating motor 26, to actuate the arm 237 to the center position on the resistor 236, is the same as the circuit just traced as far as the contact arm 237, and from this point it extends through the segment 239, conductor 265, the field winding 29 and the armature winding 27 of motor 26, and conductors 132 and 122 to the supply conductor 113.

In case the speed of the motor 157 rises above that which regulator 175 is set to maintain, the speed of the pilot generator 164 will be increased by the same amount, and the voltage generated thereby will increase. With this greater voltage impressed on the operating winding 219 of the regulator 175, the core member 218 is actuated upwardly to effect the engagement of the contact members 22 and 224, to complete a circuit through the operating winding of the electromagnet 196 thus operating the reversing switch 182 to its second operative position.

The operating circuit for the electromagnet 196 may be traced from the supply conductor 112 through conductor 268, the lever arm 221, contact members 222 and 224, conductor 269, the operating winding of the electromagnet 196 and conductors 270, 162 and 163 to the supply conductor 113.

The actuation of the switch 182 to the second operative position causes the disengagement of the contact members 199 and 203 and effects the engagement of the cooperating pairs of contact members 198—202 and 197—201. Engagement of the contact members 198 and 202 completes a circuit through the armature winding of the motor 181 which may be traced from the supply conductor 112, through conductors 158 and 216, the contact members 202 and 198 and the contact arm 193 of the reversing switch 182, conductor 191, the armature winding 189, conductor 192, the contact arm 194 and the contact members 209—213 of the reversing switch 183 and conductors 162 and 163 to the supply conductor 113, causing the motor 181 to operate in a direction to increase the resistance in the circuit of the generator field winding 153 thereby decreasing the voltage of the generator 151, and the speed of the motor 157.

The contact members 197—201 of the reversing switch 182, upon engagement, complete a circuit through a resistor 271, in shunt relation to the winding 219 of the regulator 175, thus decreasing the energization of the winding 219 and hastening the disengagement of contact members 222 and 224.

In case the speed of the motor 157 does not increase to the value for which the regulator is set, the speed of the pilot generator 164 will be below normal and the voltage impressed upon the operating winding 218 of the regulator 175 will not be sufficient to hold the core member 218 in the upward position. There is effected, for this condition, an engagement of the contact members 223 and 225 which completes a circuit through the operating winding of the electromagnet 206, thus actuating the reversing switch 183 to its second operative position.

The operating circuit for the electromagnet 206 may be traced from the supply conductor 112, through conductor 268, the lever arm 221, the contact members 223 and 225, conductor 272, the operating winding of the electromagnet 206, and conductors 270, 162 and 163 to the supply conductor 113.

Upon the actuation of the reversing switch 183 to its second operative position, the cooperating contact members 209—213 are disengaged, and the cooperating pairs of contact members 208—212 and 207—211 are brought into engagement. The engagement of the contact members 208—212 completes a circuit through the armature winding of the motor 181, causing the motor to operate in a direction opposite that previously described, to decrease the resistance of the circuit of the field winding 153, thereby increasing the voltage of the generator 151 and the speed of the motor 157. The operating circuit for the motor 181 may be traced from the supply conductor 112, through conductors 158 and 216, the contact members 212—208 and the contact arm 194 of the reversing switch 183, conductor 192, the motor armature winding 189, conductor 191, the contact arm 193 and the contact members 199—203 of the reversing switch 182 and conductors 162 and 163 to the supply conductor 113.

The contact members 207 and 211 of the reversing switch 183, upon engagement, complete a circuit for excluding a portion of the resistor 273 from the circuit of the regulator winding 219, thus increasing the energization thereof slightly and hastening the disengagement of the contact members 223 and 225 to prevent hunting action of the regulator.

The manner in which regulator 175 acts having been explained, attention may be directed to the function of segment wheel 31 and timing device 32 in the manual adjustment of the regulated motor speed, which it is preferable to make, while switch 241 is closed to the right hand or manual position, preparatory to transferring to complete automatic control by closing switch 241 to the left hand position.

If the regulated motor 157 is running above the desired speed, the "lower" segment 34 of segment wheel 31, will contact with the brush 39, at the moment the pendulum contact member 87 comes into engagement with the contact member 88, to complete a circuit for illuminating the lamp 247 to indicate to the attendant that the speed of the motor 157 should be lowered. The lamp circuit extends from the supply conductor 112, through conductor 114, the operating winding 253 of the relay 252, conductor 114a, the pendulum 85, the contact members 87 and 88, the conductor 115, the brush 39, segment 34, the conductor 115, the brush 39, segment 34, the slip-ring 44, brush 48, conductor 136, switch 241, lamp 247 and conductor 122 to the supply conductor 113.

Assuming that the regulator 175 is in stable control of the speed of the motor 157, lighting of the lamp 247, when the pendulum contact members 87 and 88 are engaging each other indicates that the speed of motor 157 is in excess of the desired value determined by timing device 32. To correct this condition control switch 244 may be closed to complete a circuit through the armature winding 232 and the differentially-related field winding 234 of the motor 231 to operate this motor in a direction to decrease the amount of resistance in the field circuit of the pilot generator 164.

The operating circuit for the motor 231 may be traced from the supply conductor 112, through conductors 167 and 262, the switch 241, conductor 274, the switch 244, conductor 275, the field winding 234, the armature winding 232, and conductor 276 to the supply conductor 113.

The decrease in the resistance of the pilot-generator field circuit increases, for a given speed, the voltage of the pilot generator 164. This increased potential, acting through regulator 175, functions to decrease the voltage of the generator 151 and the speed of the motor 157 and pilot generator 164, to some lower value at which the pilot generator voltage will, for the new degree of excitation, be equal to the original value.

Likewise, if the regulated motor 157 is running below the desired speed, because of improper adjustment of the pilot generator excitation or for any other reason, the "raise" segment 33 of wheel 31, will be caused to contact with the brush 39 when the pendulum contact members 87 and 88 come into engagement, to complete a circuit for illuminating the lamp 246. This lamp circuit is the same as that previously traced for the lamp 247 as far as the brush 39 and from that point it extends through segment 33, slip-ring 43, brush 49, conductor 136a, switch 241, the lamp 246, and conductor 122 to the supply conductor 113.

The control switch 243 may then be closed to complete a circuit through the armature winding 232 and the field winding 233 of the motor 231, to operate the motor in a direction opposite to that previously described, to increase the resistance in the field-winding circuit of the pilot generator 164 and to thus cause regulator 175 to increase the speed of the motor 157. The increase in the resistance of the field circuit decreases the voltage produced by the pilot generator 164, which modifies the action of the regulator 175 to increase the voltage of the generator 151 and the speed of the motor 157.

The operating circuit for the motor 231 extends from the supply conductor 112, through conductors 167 and 262, the switch 241, conductor 274, the switch 243, conductors 277 and 278, the field winding 233 and armature winding 232 of motor 231, and conductor 276 to the supply conductor 113.

When the speed of the motor 157 has been adjusted as closely as practicable by the manual control of the motor 231, the switch 241 may be closed to the left-hand position to place the operation of the motor 26 under the control of the segment wheel 31 and the speed reference means 32. The operation of the motor 26 is controlled in the same manner as that hereinbefore described in connection with Fig. 1. This motor effects the operation of rheostat 170 in the one or the other direction to further change the voltage generated by the pilot generator 164 and impressed upon the operating winding 219 of the regulator 175, to thereby correspondingly change the voltage of the generator 151 and the speed of regulated motor 157.

Should the speed of the motor 157 vary by a large amount from the desired speed, the reset segment 35 and the brush 39 will be in contact at the time of engagement of the pendulum contact members 87 and 88 to initiate the resetting of the segment wheel 31, as hereinbefore described in connection with Fig. 1.

Each time an operating circuit for the motor 26 is completed to give the motor a corrective impulse, the notching relay 252 is actuated and moves the contact arm 255 to the next contact point, the biasing member 256 drawing the core of the notching relay upwardly when the notching relay is deenergized.

When the contact arm 255 comes into engagement with a certain one of the contact points, say 254a, a circuit is completed through the operating winding of the reset relay 102 to actuate the relay to effect the resetting of the segment wheel as hereinbefore described in connection with Fig. 1. This circuit for operating the relay 102 extends from the supply conductor 112, through conductor 281, the contact arm 255, the contact point 254a, conductors 282 and 138, the operating winding and the bridged contact members 105 and 106 of the relay 102 and conductor 122 to the supply conductor 113.

In the embodiment of my invention illustrated in Fig. 3, the relay 102 is provided with a second movable contact member 283 that is adapted to momentarily bridge stationary contact members 284 and 285 when the relay is actuated upwardly, to establish a circuit through the operating winding of the notching relay 252 to effect the movement of the contact arm 255 away from the contact point 254a.

This circuit for operating the notching relay 252 extends from the supply conductor 112, through conductor 114, the operating winding 253 of the relay 252, a resistor 286, the bridged contact members 284 and 285 of the relay 102 and conductor 122 to the supply conductor 113.

When the motor 26 is operating in a direction to decrease the resistance in the field winding circuit of the pilot generator 164 and reaches the limit of its travel, the arm 237 of the rheostat 170 engages a contact member 291 to complete a circuit for operating the motor 231 in a direction to decrease the amount of the resistor 228 in the field winding circuit of the generator 164 in order that the rheostat 170 may operate approximately in the center of its operating range. This circuit for operating the motor 231 extends from the supply conductor 112 through conductor 167, the contact arm 237 and the contact member 291 of the rheostat 170, conductors 292 and 278, the field winding 233, the armature winding 232, and the conductor 276 to the supply conductor 113.

Likewise, when the motor 26 is operated in a direction to increase the resistance in the field-winding circuit of the pilot generator 164 it reaches the limit of its travel, the arm 237 of the rheostat 170 engages a contact member 293 to complete a circuit for operating the motor 231 in a direction to increase the amount of the resistor 228 in the field-winding circuit of the pilot generator in order that the rheostat 170 may operate approximately in the center of its operating range. The circuit for operating the motor 231 extends from the supply conductor 112, through conductor 167, the contact arm 237 and the contact member 293 of the rheostat 170, conductors 294 and 275, the field winding 234, the armature winding 232 and conductor 276 to the supply conductor 113.

Since many modifications may be made in the apparatus and the circuits described without departing from the spirit of my invention, I do not wish that my invention be limited except insofar as is necessitated by the prior art and by the scope of the appended claims.

I claim as my invention:

1. In a speed-regulating system in combination, a machine, a rotatable member carrying upon different angular sections thereof three conducting segments electrically insulated from each other and angularly separated by non-conducting zones, a stationary contact element disposed to be successively engaged by said segments as the member is rotated, a normally engaged magnetic clutch for coupling said rotatable member with the regulated machine, speed-adjusting means for the machine actuable in the "raise" and "lower" directions by the respective completion of one or the other of two circuits each one of which includes the said contact element and one of said rotatable-member segments, releasing means for said clutch actuable by the completion of a third circuit which includes the contact element and the third rotatable-member segment, and a speed reference means disposed to connect all of said circuits to a source of energization at regularly spaced time intervals, which when the speed of the regulated machine is of the desired value, occur simultaneous with the engagement periods of the stationary contact element with the rotatable member non-conducting zone intermediate the two segments in the said speed-adjusting means control circuits.

2. In a speed-regulating system, in combination, a machine, a machine-driven member which carries angularly separated conducting segments disposed to successively engage a stationary brush to set up, as the member is rotated, circuits for actuating a machine-speed-adjusting means, a speed-reference means disposed to connect said circuits to an energizing source at regularly spaced intervals with which the engagement periods of the said member segment-separating space and said brush coincide when the machine speed is of the desired value, means for releasing said member from the machine driving connection when the angular deviation of said member from the reference means impulses exceeds a predetermined value, and means for resetting said member in a synchronous position on the driving shaft after a predetermined time.

3. In a speed-regulating system in combination, a machine, a rotatable member carrying upon different angular sections thereof, three conducting segments electrically insulated from each other and angularly separated by non-conducting zones, a stationary contact element disposed to be successively engaged by said segments as the member is rotated, a normally engaged magnetic clutch for coupling said rotatable member with the regulated machine, speed-adjusting means for the machine actuable in the "raise" and "lower" directions by the respective completion of one or the other of two circuits each one of which includes the said contact element and one of said rotatable-member segments, releasing means for said clutch actuable by the completion of a third circuit which includes the contact element and the third rotatable-member segment, and a speed reference means disposed to connect all of said circuits to a source of energization at regularly spaced time intervals, which when the speed of the regulated machine is of the desired value, occur simultaneous with the engagement periods of the stationary contact element with the rotatable member non-conducting zone intermediate the two segments in the speed-adjusting means control circuits, and means operable after a time delay for re-engaging said clutch when the rotatable member occupies a normal-speed angular position with respect to the reference means.

4. In a speed-regulating system, in combination, a machine, a contact-making mechanism driven by the machine through a normally-engaged clutch mechanism, a second contact-making mechanism disposed to be driven in accordance with the desired speed of the machine, machine-speed adjusting means actuated by circuits completed at regular time intervals, by said two contact-making mechanisms when the speed of the machine varies from its desired value to cause said contact-making mechanisms to depart from a normal-speed synchronous relation, and means for recording each of said circuit completions and for effecting a release of said clutch mechanism when the number of said impulses has attained a predetermined total.

5. In a speed-regulating system, in combination, a machine, a contact-making mechanism driven by the machine through a normally-engaged clutch mechanism, a second contact-making mechanism disposed to be driven in accordance with the desired speed of the machine, machine-speed adjusting means actuated by circuits completed at regular time intervals by said two contact-making mechanisms when the speed of the machine varies from its desired value, means for recording each of said circuit completions and for effecting a release of said clutch mechanism when the number of said impulses has attained a predetermined total, and means for reengaging said clutch mechanism, after a predetermined time, when said machine-driven contact-making mechanism occupies the said normal-speed synchronous relation with respect to the said desired-speed contact-making mechanism.

HOMER C. NYCUM.